A. P. MORROW.
COASTER AND BRAKE DEVICE.
APPLICATION FILED APR. 5, 1902.
931,787.
Patented Aug. 24, 1909.
2 SHEETS—SHEET 1.
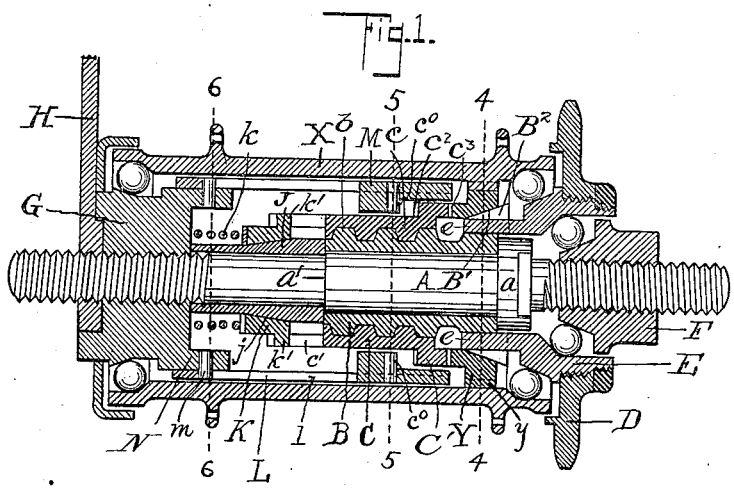
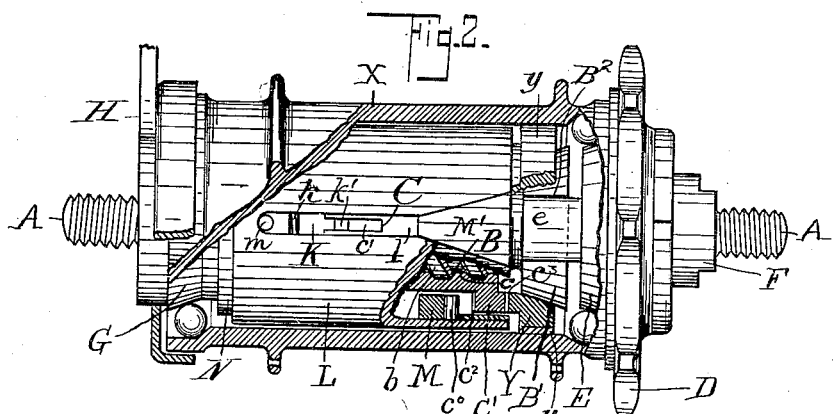
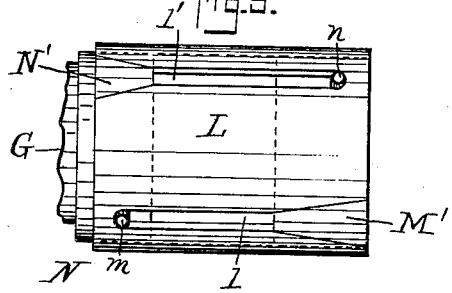
WITNESSES=
F. B. Montgomery
F. Bissell
INVENTOR=
Alexander P. Morrow
by Osgood & Davis
his attys

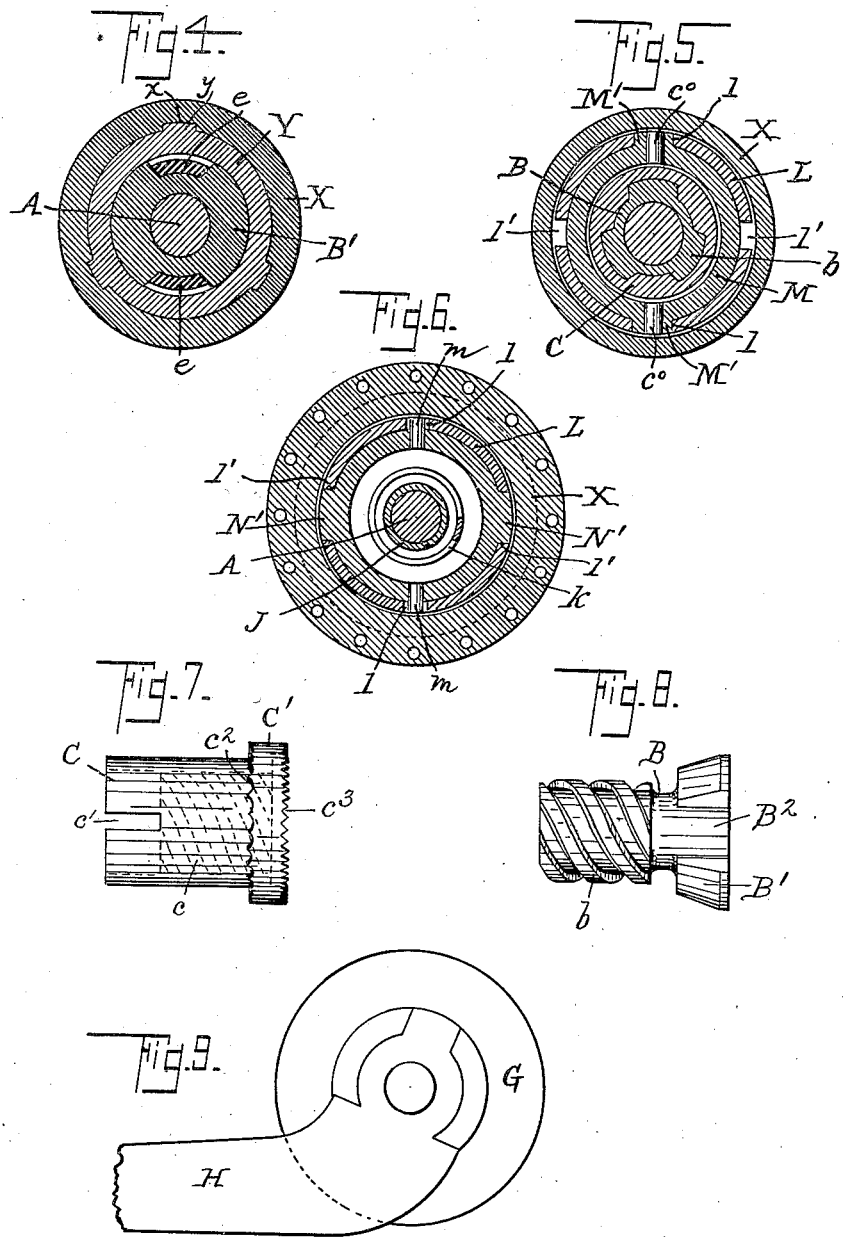

UNITED STATES PATENT OFFICE.

ALEXANDER P. MORROW, OF ELMIRA, NEW YORK.

COASTER AND BRAKE DEVICE.

931,787.

Specification of Letters Patent. Patented Aug. 24, 1909.

Application filed April 5, 1902. Serial No. 101,523.

*To all whom it may concern:*

Be it known that I, ALEXANDER P. MORROW, a citizen of the United States, and resident of Elmira, in the county of Chemung and State of New York, have invented certain new and useful Improvements in Coaster and Brake Devices, of which the following is a specification.

This invention relates to coaster and brake devices and has for its object to provide an efficient device of simple construction.

It consists in the devices hereinafter described and claimed.

In the drawings:—Figure 1 is a longitudinal section of the device; Fig. 2 is an elevation parts being broken away to show internal construction; Fig. 3, shows the brake shell; Fig. 4 is a cross section on the line 4—4 of Fig. 1; Fig. 5 is a cross section on the line 5—5 of Fig. 1; Fig. 6 is a cross section on the line 6—6 of Fig. 1; Figs. 7 and 8 are parts of the mechanism hereinafter to be explained; and Fig. 9 shows one end of the device.

A represents the axle which is secured in the rear forks of a bicycle in the usual manner. The axle has a collar $a$, and a shoulder $a'$. Upon the said axle is revolubly mounted a sleeve B having upon its exterior surface the spiral thread $b$ (see Fig. 8). The thread $b$ upon this sleeve is adapted to mesh with the internal thread $c$ upon the second sleeve C (see Fig. 7). The end of the sleeve B terminates in the conical head B', externally slotted longitudinally at $B^2$, $B^2$, and internally recessed to contain the collar or flange $a$ on the axle. The corresponding end of the sleeve C has a flange C' (see Fig. 7), both sides of which are serrated, as shown in said Fig. 7. The sprocket wheel D is rigidly secured to the sleeve E, and the said sleeve carries two lugs $e$, $e$, which are adapted to lie within the grooves $B^2$ in the head B' upon the sleeve B. The sleeve E carrying the said sprocket wheel is revolubly supported upon ball bearings, which lie in a race formed between the said collar and a nut F that is screwed upon the end of the axle. Upon the other end of the axle a block G is mounted, and this block is held against revolution by the arm H, one end of which is mortised into a socket in the end of said block, in the manner indicated in Fig. 9, and the other end is secured to the frame of the bicycle, in any suitable manner. The arm H is held upon the block G by a nut (not shown) which is screwed upon this end of the axle, or may be the same nut that fastens the axle to the bicycle frame.

A sleeve J upon the axle A between the block G and the sleeve B, has a conical surface $j$ and fitting upon this sleeve there is an internally conical sleeve K, styled the "retarder." A spring $k$, which may press against the block G, tends to force the sleeve K upon the sleeve J. The sleeve J is held stationary between the shoulder $a'$ on the axle A and the shoulder $a'$ on the axle A. Ears $k'$ projecting from the retarder K are adapted to enter slots $c'$ in the end of the internal threaded sleeve C.

The brake is the continuous cylindrical shell L (shown in Fig. 1). It is slotted from each end alternately as by the slots $l, l$, and $l', l'$. In the form shown, there are two diametrically opposite slots extending from the right hand end of the shell (see Fig. 3) to near the other end thereof, and two other diametrically opposite slots extending from the left hand end of the shell to near the right hand end thereof; the slots being set at suitable distances apart, say ninety degrees from each other. The slots are flared near their ends, as shown in Fig. 3. Within each end of the brake shell, there is a ring M and N respectively. These rings have wedges M' and N' respectively, which are adapted to fit within the flared ends of the slots $l$ and $l'$ respectively. The ring M is held within the brake shell by pins $n$, which lie within the ends of the slot $l'$. The ring N is rigidly secured to the inner end of the block G, and is prevented from being withdrawn from the brake shell L by means of pins $m$ which lie within the slots $l$ in the brake shell. Since the block G is held against rotation by the arm H, as aforesaid, which is secured to the frame of the bicycle, the brake shell L will also be held against rotation by its connection with said block through the pins $m$ and wedge-shaped shoulders N' upon the ring N; and the ring M is also non-revoluble because of its connection aforesaid with the brake shell. But the brake shell is movable longitudinally toward the left (in Fig. 1) with reference to the ring N, and the ring M is movable longitudinally in the same direction, the pins $m$ and $n$ sliding into their respective slots when the said parts are so moved with reference to one another. When the brake shell is moved to the left, the wedges N' are also forced up into the slots l' and expand the outer end of said shell, and when the ring M is moved to the left, the wedges M' are forced into the slots l and spread the inner end of said shell. If pressure is applied to the ring M to force it toward the left in Fig. 1, the wedges M' will not only spread the inner end of the shell, but will also force said shell upon the wedges N' so that the left hand end of said shell will be expanded by said wedges N', and its contractile power when the parts are released forces the wedges outward and returns them to place while the shell contracts away from the hub. By forcing wedges into the shell at two, three or more points on the circumference of the shell, it is caused to expand so that its entire circumference will be brought into engagement with the hub, and this result is best attained by entering the wedges from each side alternately. It has been found in practice that four wedges, two on each side, are efficient, when arranged as shown in the drawings, at equal distances apart and entering the slots in the shell from each side alternately.

The hub X is revoluble upon ball bearings located at each end of the hub in race-ways formed respectively between the sleeve E and said hub on the right, and between the block G and the hub on the left. Upon the inside of the hub at the right, there is a ring Y which is positively connected to the hub by means of ears y upon said ring which enter longitudinal grooves x in the hub, or by other means, so that the ring is non-rotary with reference to the hub but can have some longitudinal movement therein. The ring has a surface fitting an abutment on the head B' of the sleeve B. In the example of this invention herein shown, the ring Y has an internal conical surface fitting a conical abutment on the head B'. There are teeth on the left hand face of this ring Y that are adapted to engage the teeth $c^3$ on the right hand face of the flange C' of the sleeve C. The loose movement of the ring Y permits adjustable engagement and quick disengagement of the driving clutch and avoids pressure on the ball bearings.

The right hand face of the ring M has radial lugs to engage the serrations $c^2$ on the left hand face of the flange C of the sleeve C. The preferred form of this device is radial cylindrical pins $c^0$ set in the end of the ring M so as to project therefrom and radial flutings or serrations of curvatures adapted to fit said pins. This form gives prompt and sufficiently powerful clutching and quick release.

The sleeve C is moved toward the right and the left to drive and brake respectively by engagement with the driving ring Y on one side or with the wedge operating ring M on the other side. The sleeve C can take an intermediate position so as to be disengaged from both the driving ring and the wedge operating ring and this intermediate position is the coasting position of the parts.

The hub is driven forward by the power transmitted from the pedals to the rear sprocket D on pedaling forward when the sleeve C engages with the ring Y, and the hub is retarded or braked on back pedaling by the expansion of the brake shell L by the wedges upon the rings M and N. The operation of the several parts in accomplishing these results will now be described.

On forward pedaling, the sleeve E actuated by the sprocket wheel D turns the screw-threaded sleeve B clock-wise and moves the sleeve C toward the right, which causes the clutch teeth $c^3$ to engage with the corresponding teeth on the ring Y and stops any rotation of the sleeve C and forces the ring Y up upon the conical surface B' of the head of the sleeve B, thus locking the sleeve B, the sleeve C and the head together for driving. If the hub is rotated and the sprocket wheel and sleeve F' are stopped, the fact that the sleeve B is also stopped by this operation, and the fact that the sleeve Y is engaged with the hub and is rotated with it and is also clutched to the sleeve C will cause the sleeve C to move toward the left on the threads of the sleeve B and to become disengaged from the sleeve Y, thus permitting the hub to rotate freely although the sprocket wheel and its connected parts are stationary. The friction of the retarder ring K upon the cone J assists in causing this relative rotation of the sleeve C and its entire disengagement from the ring Y. If the sprocket wheel is now rotated backward (the retarder ring still having the same function) the sleeve B will be rotated backward and the sleeve C will be forced toward the left until the teeth $c^2$ come in engagement with the pins $c^0$ and therefore clutch the ring C to the ring M so as to prevent the rotation of said sleeve C. The backward rotation of the ring B forces the sleeve C farther toward the left and carries with it the ring M which presses the wedges M' into the ends of the slots l, and this pressure being transmitted through the brake shell L causes the wedges N' to enter and expand the slots l' so that the shell is equally expanded at both ends against the interior of the hub A and the braking friction occurs. As soon as the backward pressure upon the sprocket wheel ceases the spring action of the shell upon the wedges M' and N' forces said wedges out of the slots and relieves the braking action. On resuming the forward pedaling, the sleeve C is again forced toward the right in Fig. 1 and the clutching action first mentioned for forward driving takes place.

This device has effective driving and free coasting combinations and an extremely powerful braking mechanism due to the arrangement of the parts and the very long brake shell which makes contact with a very large surface on the hub. It is compact and designed so that the hub is the usual form and symmetrical.

What I claim is:—

1. In a brake mechanism, the combination of a revoluble hub having a braking surface; a driving member within the hub; a nonrevoluble brake shell within the hub slotted longitudinally; wedge means adapted to enter a slot of said shell longitudinally and thereby to expand it against said braking surface; and mechanism coöperating with the driving member for driving said hub on forward rotation of said driving member, and for actuating said wedge means upon back pedaling.

2. In a brake mechanism, the combination of an axle; a revoluble hub upon the axle having a braking surface; a driving member within said hub; a nonrevoluble brake shell within the hub having one or more longitudinal slots opening at one end of said shell and one or more opening at the other end; wedges adapted to enter the respective slots longitudinally and thereby to expand said shell against said braking surface on the hub; and mechanism coöperating with the driving member for driving said hub on forward rotation of said driving member, and for actuating said wedges on back pedaling.

3. In a brake mechanism, the combination of an axle; a revoluble hub upon the axle having a braking surface; a driving member within the hub; a nonrevoluble and longitudinally movable brake shell within said hub, having one or more open-ended longitudinal slots therein; a stationary block within the hub having thereon one or more wedges adapted to enter the said one or more slots and thereby to expand said shell against the braking surface on said hub; interposed means between said driving member and said shell for moving said shell longitudinally; and means for actuating said interposed means by the driving member.

4. In a brake mechanism, the combination of an axle; a revoluble hub upon the axle having a braking surface; a driving member within the hub; a nonrevoluble but longitudinally movable brake shell within said hub having one or more longitudinal slots opening at one end of said shell, and one or more opening at the other end; a stationary block within the hub having thereon wedges adapted to enter respectively those slots that open at one of the ends of said shell; wedges adapted to enter respectively the slots that open at the other end of said shell; supporting means for said last mentioned wedges; and mechanism coöperating with the driving member, for driving said hub on forward rotation of said driving member, and for moving said supporting means longitudinally on back pedaling and thereby forcing said wedges into their respective slots, whereby said shell is expanded against the braking surface of the hub.

5. In a brake mechanism, the combination of an axle; a revoluble hub upon the axle having a braking surface; a driving member within said hub; a nonrevoluble but longitudinally movable brake shell within said hub having one or more longitudinal slots opening at one end of said shell and one or more opening at the other end; a stationary block within the hub having wedges thereon adapted to enter the slots opening at one end of said shell; a nonrevoluble but longitudinally movable ring within the shell having wedges thereon adapted to enter the slots opening at the other end of said shell; and mechanism coöperating with the driving member for driving said hub on forward rotation of said driving member, and for moving said ring longitudinally on back pedaling and forcing the wedges into their respective slots whereby the shell is expanded against the braking surface of the hub.

6. In a brake mechanism, the combination of an axle; a revoluble hub thereon having a braking surface; a driving member within said hub; a nonrevoluble continuous brake shell within said hub slotted longitudinally and part way from each end whereby it is expansible at both ends; means at each end of said shell for expanding it against the braking surface of the hub; and mechanism coöperating with the driving member for driving said hub on forward rotation of said driving member and on back pedaling for actuating said shell-expanding means.

7. In a brake mechanism, the combination of an axle; a revoluble hub upon said axle and having a braking surface; a stationary block at one end of said hub; a driving member within the hub; an expansible brake shell within said hub slotted longitudinally part way of its length and concentric therewith, supported at one end upon the said stationary block and at the other end surrounding said driving member; and shell-expanding means located within said shell coöperating with the driving member on back pedaling whereby on back pedaling said shell is expanded against said braking surface.

8. In a brake mechanism, the combination of a revoluble hub having a braking surface; a stationary block at one end of said hub; a driving member within said hub; a longitudinally slotted brake shell at one end surrounding said driving member, and at the other end supported by said block; wedge means on said block and adapted to enter a slot of said shell longitudinally to expand the same; and mechanism coöperating with the driving member for driving said hub on forward rotation of said driving member and for actuating said wedge means on back pedaling.

9. In a brake mechanism, the combination of an axle; a revoluble hub thereon; a stationary block at one end of said hub; a driving member within said hub; a brake shell at one end surrounding said driving member and supported at its other end by said block, and having different longitudinal slots extending part way of its length and one or more opening at one end of the shell and one or more opening at the other end thereof; wedges on the stationary block and adapted to enter the slots that are open at that end of the shell; nonrotative wedges adapted to enter the slots that open at the other end of said shell; and mechanism located in said hub coöperating with the driving member on back pedaling for forcing said wedges into said slots, whereby said shell is expanded against the braking surface of said hub, and for driving said hub on forward rotation of said driving member.

10. In a brake mechanism, the combination of an axle; a revoluble hub thereon; a stationary block at one end of said hub; a driving member within said hub; a brake shell at one end surrounding said driving member and supported at the other end by said block, and having different series of longitudinal slots extending part way of its length and opening alternately at each end of the shell; wedges on the block adapted to enter the slots that are open at that end of the shell; nonrotative wedges adapted to enter the slots that open at the other end of said shell; and mechanism located in said hub coöperating with the driving member on back pedaling for forcing said wedges into said slots, whereby said shell is expanded against the braking surface of said hub, and for driving said hub on forward rotation of said driving member.

11. In a brake mechanism, the combination of a revoluble hub having a braking surface; a driving member within the hub; a brake shell L having the longitudinal slots l, l'; the stationary block G; the wedges N' secured to said block; the wedges M'; means connecting said shell and said wedges and permitting their longitudinal movement with reference to each other; and mechanism coöperating with the driving member on back pedaling for forcing said wedges into their respective slots and expanding the said shell against said braking surface.

12. In a driving and brake mechanism, the combination of a revoluble hub having a braking surface; a driving member; a non-revoluble longitudinally slotted brake shell within the hub; wedge means adapted to enter a slot in said shell longitudinally, and thereby to expand it against said braking surface; and means actuated by said driving member to drive said hub on forward rotation of said driving member, and to operate said wedge means on backward rotation thereof.

13. In a back pedaling brake and coaster mechanism, the combination of an axle; a revoluble hub thereon; a driving wheel capable of rotation in two directions; a driving member turned by said driving wheel; a brake mechanism; a driven member for actuating the brake mechanism and rotated by said driving member; a hollow cone rotated by said driven member; a nonrotary cone within the hollow cone; and means for maintaining frictional engagement between the two cones.

14. In a back pedaling brake and coaster mechanism, the combination of an axle; a revoluble hub thereon; a driving wheel; an externally threaded sleeve; an internally threaded sleeve having a shoulder; means for connecting the internally threaded sleeve with the hub for forward driving; means for connecting said externally threaded sleeve with the driving wheel; a nonrotary sleeve; a retarder; a loose connection between said retarder and said internally threaded sleeve whereby said retarder is movable longitudinally; a spring for pressing the retarder against the nonrotary sleeve; and a shoulder upon the inner surface of the hub adapted to engage with the shoulder upon the internally threaded sleeve on forward pedaling to drive said hub, substantially as described.

15. In a back pedaling brake and coaster mechanism, the combination of a revoluble hub; a driving member rotatable in both directions; a serrated part movable longitudinally by rotation of said driving member; a braking mechanism; and a nonrevoluble and longitudinally movable brake actuating mechanism actuated by said serrated part and having means for meshing with the serrations thereof.

16. In a back pedaling brake and coaster mechanism, the combination of a revoluble hub; a driving member rotatable in both directions; a serrated part movable longitudinally by rotation of said driving mechanism; a braking mechanism; a nonrevoluble and longitudinally movable brake actuating mechanism actuated by movement of said serrated part in one direction and having means for meshing with the serrations thereof; and a driving clutch set by movement of said serrated part in the other direction.

17. In a back pedaling brake and coaster mechanism, the combination of a revoluble hub; a driving member rotatable in both directions; a serrated part movable longitudinally by rotation of said driving member; a brake shell having a longitudinal slot; and a nonrevoluble and longitudinally movable brake actuating mechanism actuated by said serrated part and having means for meshing with the serrations thereof and comprising a wedge movable in said slot and expanding said shell.

18. In a back pedaling brake and coaster mechanism, the combination of a revoluble hub; a driving member rotatable in both directions; a serrated part movable longitudinally by rotation of said driving mechanism; a brake shell having a longitudinal slot; a nonrevoluble and longitudinally movable brake actuating mechanism actuated by movement of said serrated part in one direction and having means for meshing with the serrations thereof and comprising a wedge movable in said slot for expanding said shell; and a driving clutch set by movement of said serrated part in the other direction.

19. In a back pedaling brake and coaster mechanism, the combination of a revoluble hub; a driving member rotatable in both directions and having an abutment; a serrated member positively connected to the hub and having a loose longitudinal movement therein; and a serrated part movable longitudinally by rotation of said driving member and adapted by said movement to cause meshing of the serrated parts and to clamp said serrated member between said serrated part and said abutment.

20. In a back pedaling brake and coaster mechanism, the combination of a revoluble hub; a driving member rotatable in both directions and having a conical abutment; a serrated member positively connected to the hub and having a loose longitudinal movement therein and provided with a conical surface fitting said conical abutment; and a serrated part movable longitudinally by rotation of said driving member and adapted by said movement to cause meshing of the serrated parts and to force the conical surface of said serrated member upon said conical abutment.

ALEXANDER P. MORROW.

Witnesses:
  C. M. PERKINS,
  F. BISSELL.